(12) United States Patent
Danley

(10) Patent No.: US 9,205,610 B1
(45) Date of Patent: Dec. 8, 2015

(54) HEAD-ON LASER SHAPING OF OPTICAL SURFACES OF OPTICAL FIBERS, AND RELATED ASSEMBLIES AND METHODS

(71) Applicant: Jeffrey Dean Danley, Hickory, NC (US)

(72) Inventor: Jeffrey Dean Danley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 442 days.

(21) Appl. No.: 13/760,618

(22) Filed: Feb. 6, 2013

Related U.S. Application Data

(60) Provisional application No. 61/701,864, filed on Sep. 17, 2012.

(51) Int. Cl.
B29D 11/00 (2006.01)

(52) U.S. Cl.
CPC .................. B29D 11/00663 (2013.01)

(58) Field of Classification Search
CPC .......... C03B 37/14; C03B 37/15; G02B 6/25; G02B 6/28; G02B 6/2552; G02B 6/3846
See application file for complete search history.

(56) References Cited

U.S. PATENT DOCUMENTS

| | | | |
|---|---|---|---|
| 4,147,402 A | 4/1979 | Chown | 350/96.18 |
| 4,345,930 A | 8/1982 | Basola et al. | 65/102 |
| 4,510,005 A | 4/1985 | Nijman | 156/221 |
| 4,678,268 A | 7/1987 | Russo et al. | 350/96.18 |
| 4,859,827 A | 8/1989 | Coyle, Jr. et al. | 219/121.64 |
| 4,932,989 A * | 6/1990 | Presby | 65/387 |
| 5,011,254 A | 4/1991 | Edwards et al. | 350/96.18 |
| 5,101,090 A | 3/1992 | Coyle, Jr. et al. | 219/121.68 |
| 5,226,101 A * | 7/1993 | Szentesi et al. | 385/85 |
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/31 |
| 5,421,928 A | 6/1995 | Knecht et al. | 156/153 |
| 5,459,803 A * | 10/1995 | Yamane et al. | 385/33 |
| 5,772,720 A * | 6/1998 | Taira-Griffin et al. | 65/387 |
| 5,954,974 A | 9/1999 | Broer et al. | 216/2 |
| 5,966,485 A | 10/1999 | Luther et al. | 385/85 |
| 6,139,196 A | 10/2000 | Feth et al. | 385/97 |
| 6,246,026 B1 | 6/2001 | Vergeest | 219/121.72 |
| 6,281,471 B1 * | 8/2001 | Smart | 219/121.62 |
| 6,282,349 B1 | 8/2001 | Griffin | 385/81 |
| 6,361,219 B1 * | 3/2002 | Blyler et al. | 385/85 |
| 6,413,450 B1 | 7/2002 | Mays, Jr. | 264/1.27 |

(Continued)

FOREIGN PATENT DOCUMENTS

| | | | | |
|---|---|---|---|---|
| WO | 01/61394 A1 | 8/2001 | | G02B 6/26 |
| WO | 01/61395 A1 | 8/2001 | | G02B 6/26 |

(Continued)

*Primary Examiner* — Daniel McNally

(57) ABSTRACT

Head-on laser shaping of optical surfaces on optical fibers, related assemblies and methods are disclosed. By "head-on laser shaping," a laser beam is directed in a laser beam path collinear or substantially collinear to the longitudinal fiber axis of an end portion of an optical fiber. The end face of the end portion of optical fiber is exposed to the laser beam to laser shape a polished optical surface in the end face of the optical fiber. In this manner, the entire surface area of the end face of the optical fiber can be exposed to the laser beam during laser shaping, making it unnecessary unless desired, to rotate the optical fiber or laser beam during laser processing. The cross section energy distribution of the laser beam can also be controlled to laser shape an optical surface in the end face of the optical fiber of the desired geometry.

21 Claims, 8 Drawing Sheets

(56) References Cited

U.S. PATENT DOCUMENTS

| | | | |
|---|---|---|---|
| 6,509,547 B1 | 1/2003 | Bernstein et al. | 219/121.68 |
| 6,534,741 B2 | 3/2003 | Presby | 219/121.69 |
| 6,738,544 B2 | 5/2004 | Culbert et al. | 385/33 |
| 6,742,936 B1 | 6/2004 | Knecht et al. | 385/67 |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 * | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,377,700 B2 | 5/2008 | Manning et al. | 385/72 |
| 7,419,308 B2 | 9/2008 | Ma | 385/54 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 2004/0234211 A1 | 11/2004 | Durrant et al. | 385/88 |
| 2005/0008307 A1 | 1/2005 | Culbert et al. | 385/123 |
| 2005/0284852 A1 | 12/2005 | Vergeest et al. | 219/121.67 |
| 2006/0137403 A1 | 6/2006 | Barr et al. | 65/377 |
| 2006/0266743 A1 | 11/2006 | Chi et al. | 219/121.69 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |

FOREIGN PATENT DOCUMENTS

| | | | |
|---|---|---|---|
| WO | 01/61870 A2 | 8/2001 | |
| WO | 2004/003612 A1 | 1/2004 | G02B 6/25 |
| WO | 2008/103239 A1 | 8/2008 | B23K 26/00 |

* cited by examiner

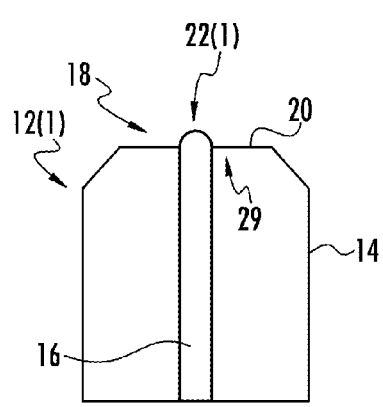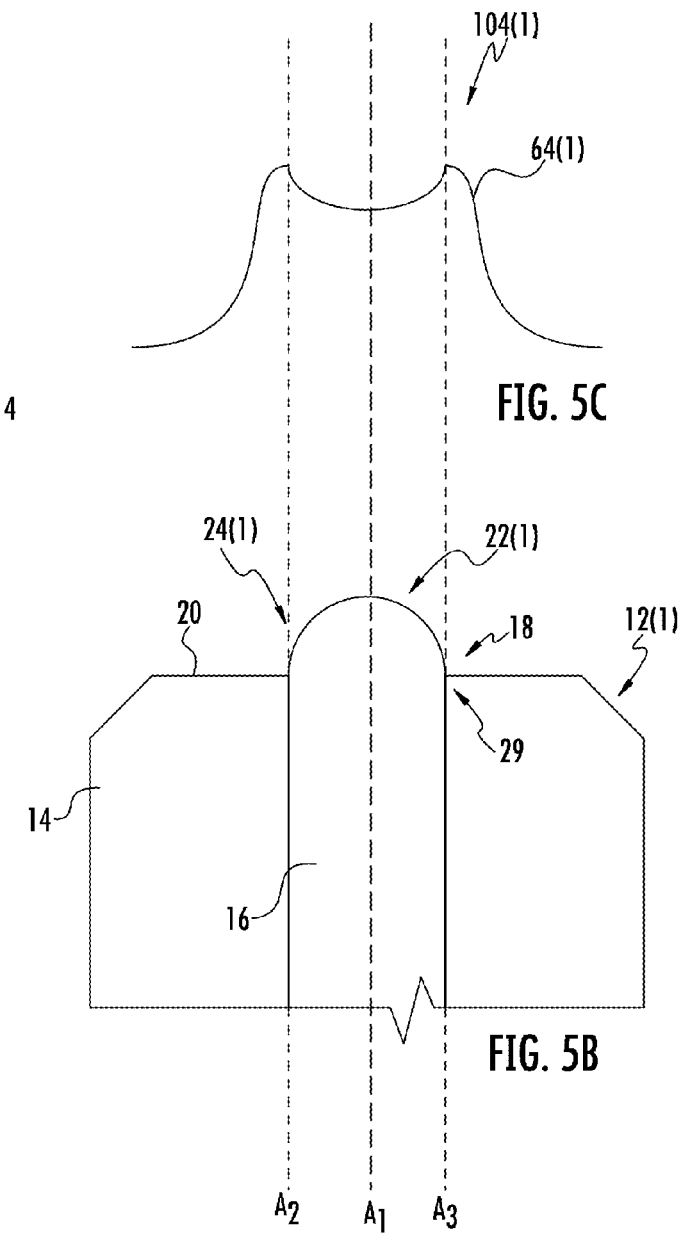

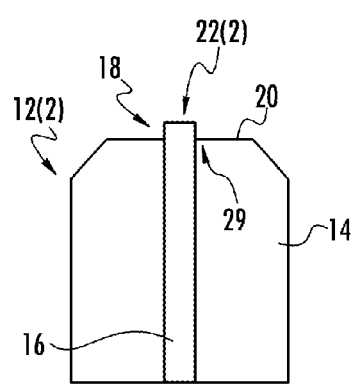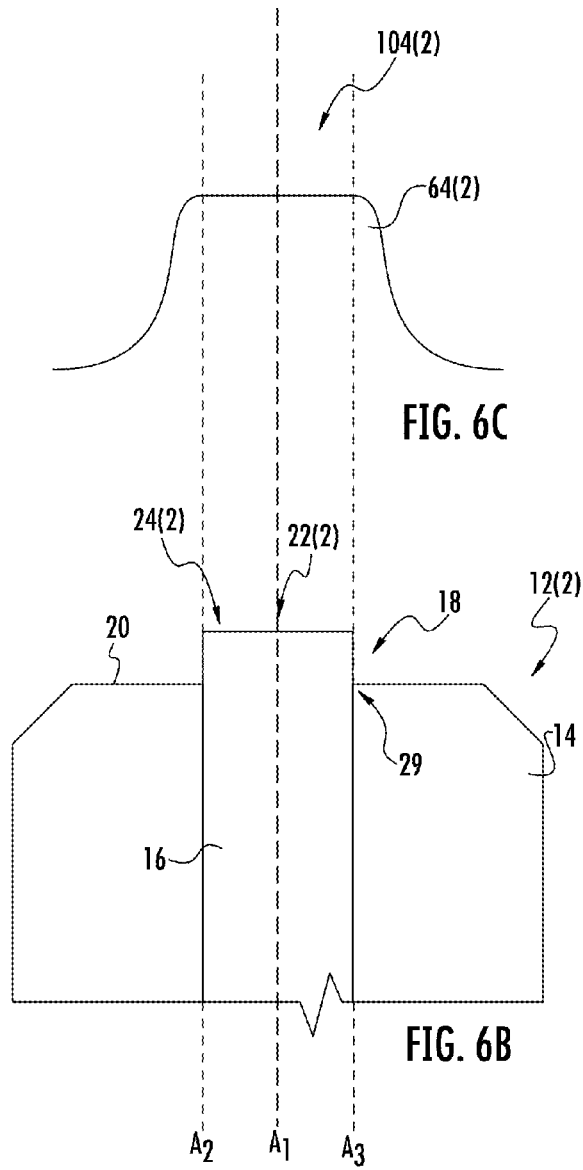

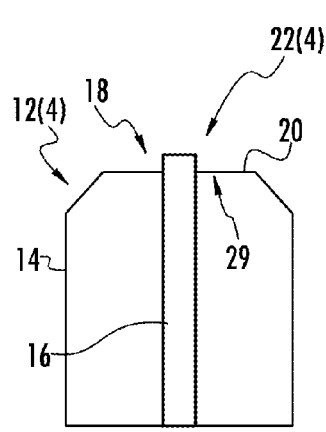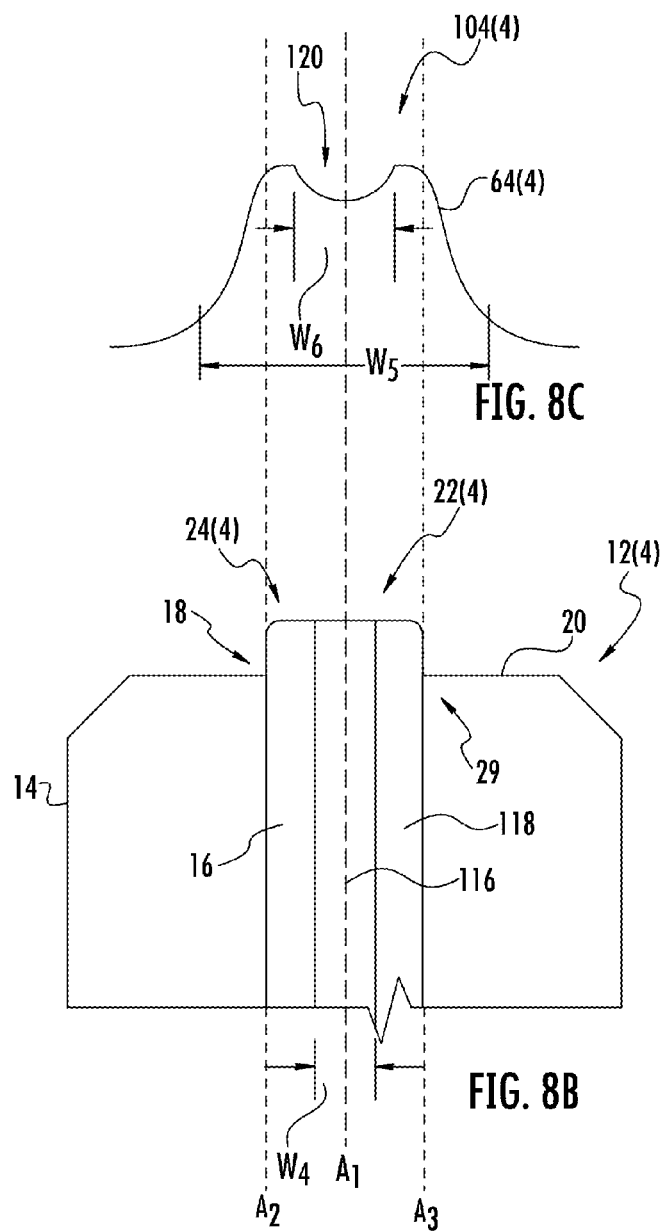

HEAD-ON LASER SHAPING OF OPTICAL SURFACES OF OPTICAL FIBERS, AND RELATED ASSEMBLIES AND METHODS

RELATED APPLICATIONS

This application claims the benefit of priority under 35 U.S.C. §119 of U.S. Provisional Application Ser. No. 61/701,864 filed on Sep. 17, 2012, the content of which is relied upon and incorporated herein by reference in its entirety.

BACKGROUND

1. Field of the Disclosure

The technology of the disclosure relates to creating optical surfaces on end portions of optical fibers disposed in ferrules as part of fiber optic connector assemblies to establish fiber optic connections.

2. Technical Background

Benefits of utilizing optical fiber include extremely wide bandwidth and low noise operation. Because of these advantages, optical fiber is increasingly being used for a variety of applications, including but not limited to broadband voice, video, and data transmission in communications networks. As a result, communications networks include a number of optical interconnection points in fiber optic equipment and between fiber optic cables in which optical fibers must be interconnected via fiber optic connections. To conveniently provide these fiber optic connections, fiber optic connectors are provided. A fiber optic connector includes a housing that provides internal components for receiving, supporting, protecting, and aligning one or more end portions of optical fibers exposed from a fiber optic cable(s) when mated with other fiber optic connectors or adapters provided in fiber optic equipment or fiber optic cables. Fiber optic connectors may be installed on fiber optic cables in the field. Alternatively, fiber optic cables may be "pre-connectorized" during the manufacturing of the fiber optic cables.

To receive, support, and position an optical fiber in a fiber optic connector, a ferrule is typically provided in the fiber optic connector. A ferrule is a component that receives, supports, and positions an optical fiber(s) in a known location with respect to a housing of a fiber optic connector. Thus, when the housing of the fiber optic connector is mated with another fiber optic connector or adapter, the optical fiber(s) in the ferrule is positioned in a known, fixed location about the housing of the fiber optic connector. Thus, the optical fiber(s) are aligned with other optical fiber(s) provided in the mated fiber optic connector or adapter to establish an optical connection(s). In some fiber optic connectors, a "pass-through" ferrule is provided that includes a front opening and a rear opening on each end of a ferrule bore. The ferrule allows an optical fiber to pass through the ferule bore and through the front opening of the ferrule to extend past the front end face of the ferrule. The end portion of the optical fiber may be polished during the connectorization process. Polishing the end portion of an optical fiber can reduce or eliminate scratches, cracks, or other blemishes that could otherwise cause optical attenuation. Polishing the end portion of the optical fiber prepares an optical surface on an end face of the optical fiber for low attenuation optical signal transfer. In fiber optic connectors employing "pass-through" ferrules, the height of the optical surface from the rear end face of the ferrule may also need to be precisely controlled as part of polishing to minimize an air gap between mated optical fibers and/or to meet fiber optic connector industry standards (e.g., consistent with International Standard CEI/IEC 61755-3-2).

Mechanical polishing processes can be employed, but are labor-intensive. For example, in a mechanical polishing process, optical fibers are manually routed through and secured within a ferrule such that an end portion of the optical fiber extends past a front end face of the ferrule at an initial height. The end portion of the optical fiber is then mechanically polished to create an optical surface at the desired height from the front end face of the ferrule. Mechanical polishing equipment can be expensive and not have the desired manufacturing throughput. For example, mechanical polishing equipment may include a fixture that is configured to support multiple ferrule assemblies for polishing as part of a batch process. At various stages of polishing, the ferrules and respective optical fibers may be removed, cleaned, and inspected. Also, this human involvement can lead to optical surface variations in mechanical polishing processes.

To minimize defects in prepared optical surfaces of optical fibers and improve manufacturing productivity, laser polishing may be employed. Laser polishing involves exposing the end portion of the optical fiber extending from the end face of a ferrule to a laser beam. This exposure can be controlled to create an optical surface in the end portion of the optical fiber. However, it may be difficult or not possible to control a laser beam envelope to create a desired optical surface in the end portion of the optical fiber at the desired height from the end face of the ferrule without also exposing the ferrule to the laser beam. Exposing the ferrule to the laser beam can damage the ferrule. Thus, if laser polishing processes are employed so as to not expose the ferrule to the laser beam, the laser beam is controlled to create an optical surface in the end portion of the optical fiber at a larger distance from the end face of the ferrule. Then, a separate mechanical polishing process can be employed to reduce the height of the optical surface from the end face of the ferrule to create the desired height of the optical surface. Mechanical polishing of optical fibers involves human processing and associated labor costs. Mechanical polishing also introduces variances between prepared optical surfaces in ferrule assemblies.

SUMMARY OF THE DETAILED DESCRIPTION

Embodiments disclosed herein include head-on laser shaping of optical surfaces on optical fibers. Related assemblies and methods are also disclosed. By "head-on laser shaping," it is meant that a laser beam is directed in a laser beam path collinear or substantially collinear to the longitudinal axis (i.e., the fiber axis) of an end portion of an optical fiber. The end face of the end portion of optical fiber is exposed to the laser beam to laser shape a polished optical surface in the end face of the optical fiber. In this manner, the entire surface area of the end face of the optical fiber can be exposed to the laser beam at the same time during laser shaping, making it unnecessary, unless desired, to rotate the optical fiber or rotate the laser during laser processing. No physical contact with the optical fiber is necessary to form the polished optical surface in the end face of the optical fiber. The head-on laser shaping of the optical fiber can also be used to change the geometry, radius of curvature, apex, and fiber roughness of the optical surface of the end portion of an optical fiber. The head-on laser shaping of optical surfaces in optical fibers can also be performed in one laser processing step, if desired. The cross section energy distribution of the laser beam can also be controlled to laser shape an optical surface in the end face of the optical fiber of the desired geometry as part of the one step laser processing. Also, the duration of the exposure of the optical fiber to the laser beam can be controlled to control the distance between end face of the optical fiber and an end face of a ferrule in which the optical fiber is disposed as part of a ferrule assembly.

In this regard in one embodiment, a method of head-on laser shaping an optical surface on an optical fiber is provided. The method comprises providing an optical fiber disposed along a longitudinal fiber axis and having an end face disposed in an end portion of the optical fiber. The method also comprises providing a laser configured to emit a laser beam in a laser beam path. The method also comprises controlling the laser to emit the laser beam in a laser beam path collinear or substantially collinear to the longitudinal fiber axis of the optical fiber, to expose the end face of the optical fiber to the laser beam to laser shape an optical surface in the end face of the optical fiber.

In another embodiment, a laser processing apparatus for head-on laser shaping an optical surface on an optical fiber is provided. The laser processing apparatus comprises a laser configured to emit a laser beam in a laser beam path. The laser processing apparatus also comprises a fixture supporting an optical fiber disposed along a longitudinal fiber axis, the fixture positioning an end face of an end portion of the optical fiber in a laser beam path collinear or substantially collinear to longitudinal fiber axis of the optical fiber. The laser processing apparatus also comprises a controller configured to direct the laser to emit the laser beam to expose the end face of the optical fiber to the laser beam to laser shape an optical surface in the end face of the optical fiber Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 5A is a side view of a first exemplary ferrule assembly comprising a rounded optical surface formed in an end face of an optical fiber extending from a ferrule by the laser processing apparatus in FIG. 2 emitting a laser beam head-on to the end portion of the optical fiber;

FIG. 5B is a close-up side view of the ferrule assembly in FIG. 5A;

FIG. 5C is a side view of energy distribution of the laser beam emitted by the laser in the laser processing apparatus in FIG. 2 to form the rounded optical surface in the optical fiber of the ferrule assembly in FIGS. 5A and 5B;

FIG. 6A is a side view of another exemplary ferrule assembly comprising a planar optical surface formed in an end face of an optical fiber extending from a ferrule by the laser processing apparatus in FIG. 2 emitting a laser beam head-on to the end portion of the optical fiber;

FIG. 6B is a close-up side view of the ferrule assembly in FIG. 6A;

FIG. 6C is a cross section of the energy distribution of the laser beam emitted by the laser in the laser processing apparatus in FIG. 6A to form the planar optical surface in the optical fiber of the ferrule assembly in FIGS. 6A and 6B;

FIG. 8A is a side view of another exemplary ferrule assembly comprising a concave optical surface formed in an end face of a multi-mode optical fiber extending from a ferrule by the laser processing apparatus in FIG. 2 emitting a laser beam head-on to the end portion of the optical fiber;

FIG. 8B is a close-up side view of the ferrule assembly in FIG. 8B; and

FIG. 8C is a cross section of the energy distribution of the laser beam emitted by the laser in the laser processing apparatus in FIG. 2 to form the concave optical surface in the multi-mode optical fiber of the ferrule assembly in FIGS. 8A and 8B.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include head-on laser shaping of optical surfaces on optical fibers. Related assemblies and methods are also disclosed. By "head-on laser shaping," it is meant that a laser beam is directed in a laser beam path collinear or substantially collinear to the longitudinal axis (i.e., the fiber axis) of an end portion of an optical fiber. The end face of the end portion of optical fiber is exposed to the laser beam to laser shape a polished optical surface in the end face of the optical fiber. In this manner, the entire surface area of the end face of the optical fiber can be exposed to the laser beam at the same time during laser shaping, making it unnecessary, unless desired, to rotate the optical fiber or rotate the laser during laser processing. No physical contact with the optical fiber is necessary to form the polished optical surface in the end face of the optical fiber. The head-on laser shaping of the optical fiber can also be used to change the geometry, radius of curvature, apex, and fiber roughness of the optical surface of the end portion of an optical fiber. The head-on laser shaping of optical surfaces in optical fibers can also be performed in one laser processing step, if desired. The cross section energy distribution of the laser beam can also be controlled to laser shape an optical surface in the end face of the optical fiber of the desired geometry as part of the one step laser processing. Also, the duration of the exposure of the optical fiber to the laser beam can be controlled to control the distance between end face of the optical fiber and an end face of a ferrule in which the optical fiber is disposed as part of a ferrule assembly.

Figure 1A:
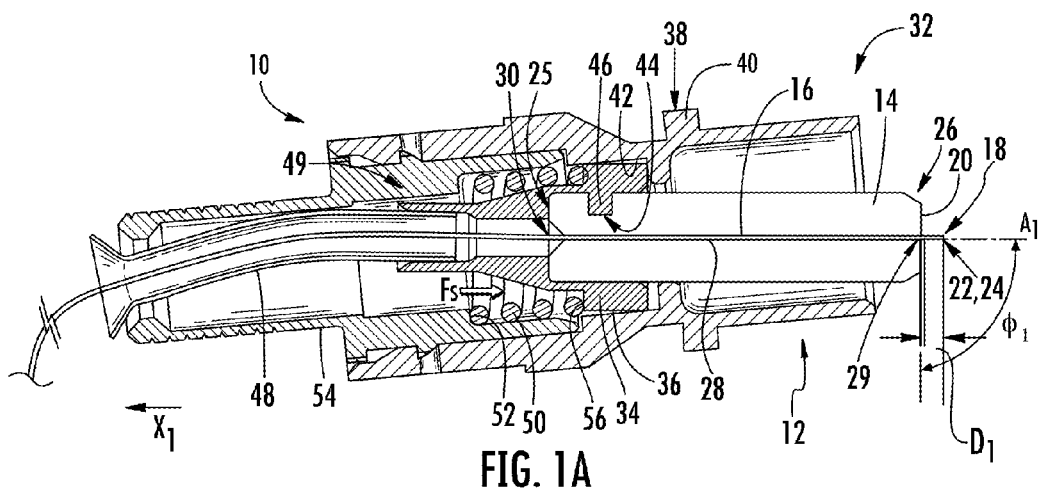
FIG. 1A is a side cross-sectional view of an exemplary fiber optic connector sub-assembly that includes a ferrule assembly comprising an exemplary ferrule and an optical fiber disposed in the ferrule, wherein an optical surface can be formed in an end face of the optical fiber extending from the end of the ferrule by head-on laser shaping.
Figure 1B:
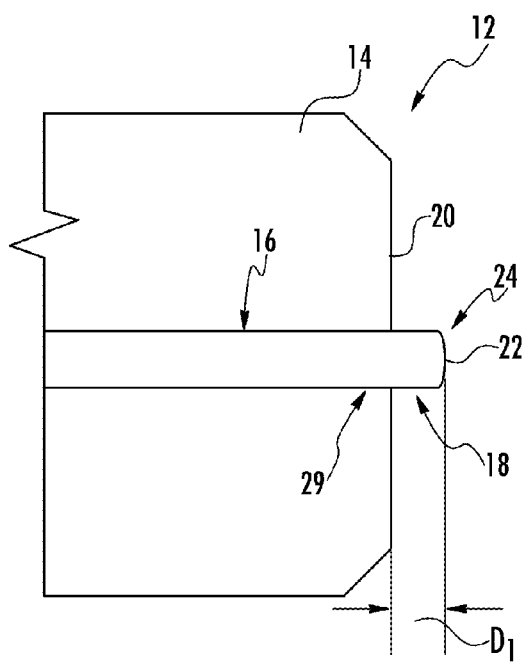
FIG. 1B is a close-up side view of the ferrule assembly illustrating the end portion of the optical fiber disposed in the ferrule bore and extending past the end face of the ferrule.

Before discussing examples of head-on laser shaping of optical surfaces in optical fibers, an exemplary fiber optic connector sub-assembly 10 that includes a ferrule assembly 12 having an exemplary ferrule 14 and optical fiber 16 supported therein is first described with regard to FIGS. 1A and 1B. In this regard, FIG. 1A is a side cross-sectional view of an exemplary fiber optic connector sub-assembly 10. The fiber optic connector sub-assembly 10 includes a ferrule assembly 12 having an exemplary ferrule 14 and optical fiber 16 disposed therein. An end portion 18 of the optical fiber 16 extends past an end face 20 of the ferrule 14. As will be discussed in more detail below, laser processing can be employed to head-on laser shape an optical surface 22 in an end face 24 of the optical fiber 16. The optical surface 22 is polished as part of the head-on laser shaping process. As will also be discussed in more detail below, head-on laser processing can also be employed to laser shape the optical surface 22 in the end face 24 of the optical fiber 16 to the desired geometry and distance from the end face 20 of the ferrule 14. This is illustrated in more detail in the close-up view of the end portion of the optical fiber 16 extending from the end face 20 of the ferrule 14 in FIG. 1B.

With continuing reference back to FIG. 1A, the ferrule 14 laterally and angularly aligns the end portion 18 of the optical fiber 16 at the end face 20 of the ferrule 14. The ferrule 14 includes a first end 25, a second end 26, and a ferrule bore 28 (also known as a "microbore") extending between the first end 25 and the second end 26. The optical fiber 16 is disposed through the ferrule bore 28 that extends along the center longitudinal or fiber axis $A_1$ of the ferrule 14. A first opening 30 is disposed at the first end 25 of the ferrule 14. The first opening 30 provides a passageway by which the end portion 18 of the optical fiber 16 enters the ferrule bore 28 of the ferrule 14. The first opening 30 may be cone-shaped to provide easy entry of the optical fiber 16 into the ferrule bore 28. The end portion 18 of the optical fiber 16 exits the ferrule bore 28 and extends past the end face 20 of the ferrule 14 through a second opening 29 in the second end 26 of the ferrule 14 to an initial height $D_1$ before laser shaping is performed. The optical fiber 16 may be secured within the ferrule bore 28 with a bonding agent. The bonding agent may prevent movement of the optical fiber 16 within the ferrule bore 28 to minimize signal attenuation between the optical fiber 16 and the complementary receptacle (not shown), which may include an opposing optical fiber. Movement of the optical fiber 16 within the ferrule bore 28 may be undesirable because the movement may cause attenuation.

With continuing reference to FIG. 1A, the ferrule 14 may be disposed at a front end 32 of the fiber optic connector sub-assembly 10. The first end 25 of the ferrule 14 may be at least partially disposed within a ferrule holder body 34. The ferrule holder body 34 supports the ferrule 14 within the fiber optic connector sub-assembly 10. The ferrule holder body 34 may support the end face 20 of the ferrule 14 to be disposed orthogonal to the fiber axis $A_1$ or angled at angle $\phi_1$ (phi) with respect to the fiber axis $A_1$. For example, the angle $\phi_1$ \may be within ten (10) degrees of orthogonal with respect to the fiber axis $A_1$, as depicted in FIG. 1A. The angle $\phi_1$ may be angled to be non-orthogonal to increase the contact area between the optical fiber 16 and another optical fiber of the complementary receptacle (not shown).

With continuing reference to FIG. 1A, the ferrule holder body 34 may include a body alignment surface 36 which may be disposed to allow easy insertion of the ferrule holder body 34 within a housing 38 of the fiber optic connector sub-assembly 10. The housing 38 in this embodiment includes an inner housing 40 including a housing alignment surface 42. The second end 26 of the ferrule 14 may be at least partially disposed within the inner housing 40. In this regard, the ferrule 14 may be protected from random perturbation forces ("side loads") orthogonal to the fiber axis $A_1$ when unmated to the complementary receptacle (not shown). It is noted that the ferrule holder body 34 may also be used in other fiber optic connectors including a spring-loaded ferrule holder body 34 without the inner housing 40, for example, non-SC type fiber optic connectors. In these other fiber optic connectors, the housing may be an enclosure (not shown) around the ferrule holder body 34. The ferrule 14 may also include a ferrule notch 44. The ferrule notch 44 may be filled with a portion 46 of the ferrule holder body 34 to prevent the ferrule 14 from disengaging from the ferrule holder body 34. The ferrule holder body 34 may comprise molded plastic as a non-limiting example.

With continuing reference to FIG. 1A, the fiber optic connector sub-assembly 10 may also include a lead-in tube 48 engaged to a rear end 49 of the ferrule holder body 34 to facilitate alignment of the optical fiber 16. A spring 50 may be disposed between a spring seat base 52 of a crimp body 54 attached to the inner housing 40 and a spring seating surface 56 of the ferrule holder body 34. The spring 50 in this example is biased to apply a spring force $F_s$ to the spring seating surface 56 to push the ferrule holder body 34 and thereby push the end face 20 of the ferrule 14 against a complementary receptacle (not shown). When contact is made between the end face 20 of the ferrule 14 and a complementary receptacle, the ferrule holder body 34 translates in the rear direction $X_1$, and the force $F_s$ will press the end face 20 against a complementary receptacle to minimize attenuation.

Figure 2:
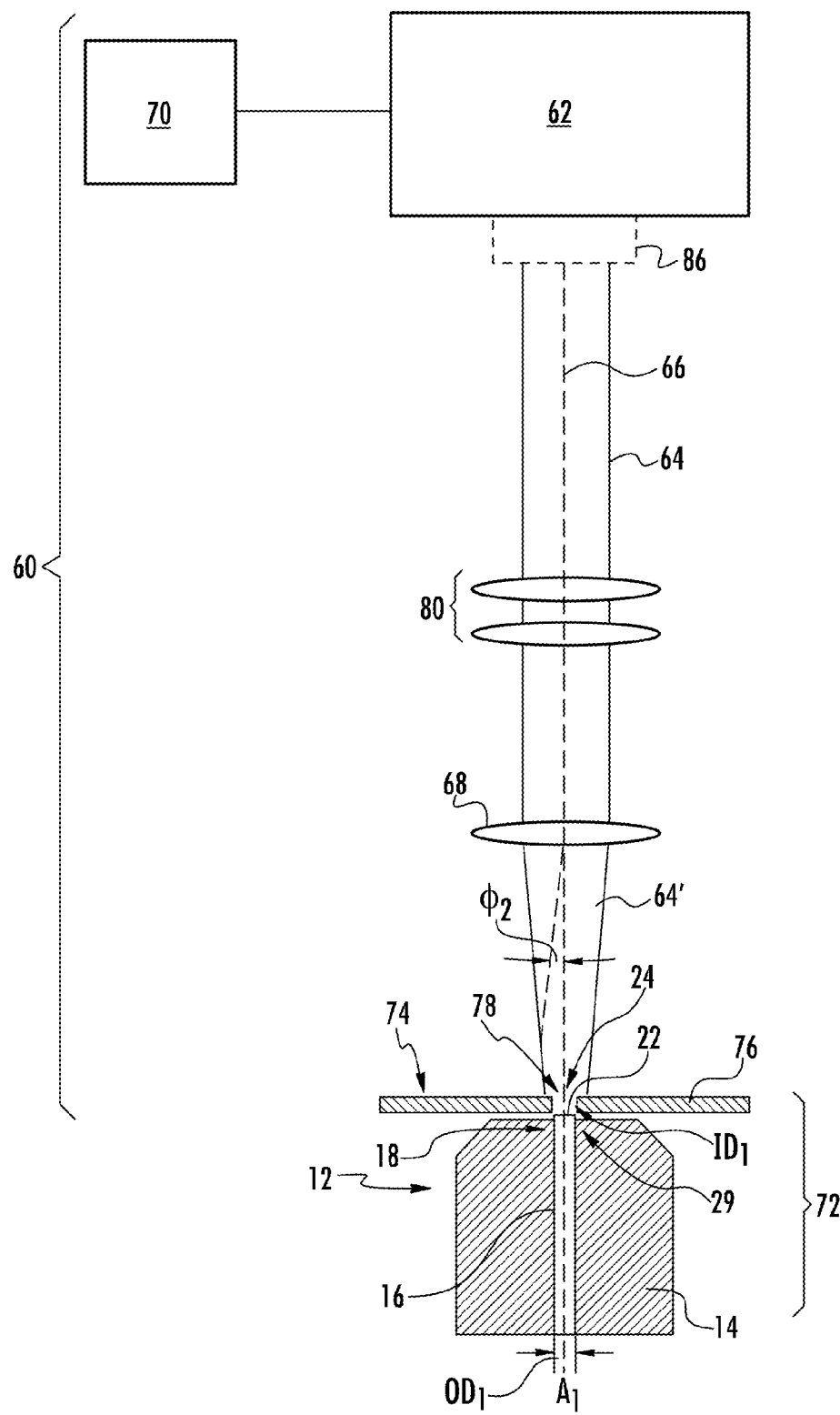
FIG. 2 is a side view of one embodiment of an exemplary laser processing apparatus including a laser configured to emit a laser beam head-on to an end portion of an optical fiber in a ferrule assembly to form an optical surface of a desired geometry in an end face of the optical fiber.

To head-on laser shape the optical surface 22 in the end face 24 of the optical fiber 16 in the fiber optic connector sub-assembly 10 of FIG. 1A, an exemplary laser processing apparatus 60 is provided in FIG. 2. FIG. 2 is a side view of the exemplary laser processing apparatus 60. The laser processing apparatus 60 in this embodiment includes a laser 62 configured to emit a laser beam 64 in a laser beam path 66 "head-on" to the end portion 18 of the optical fiber 16. The laser 62 may be a carbon-monoxide (CO) laser or carbon-dioxide ($CO_2$) laser, as non-limiting examples. As another example, laser beam 62 may be 200 nanometer (nm) to 355 nm excimer or solid state ultraviolet (UV) laser with pulsing capabilities (e.g., in picoseconds range, e.g., 0.01 ns to 100 µs), as a non-limiting example. Femtosecond lasers may also be employed. As a further non-limiting example, the wavelength range of the laser beam 64 emitted by the laser 62 may be provided between 3,000 nm to 11,000 nm. As an example, the wavelength range of the laser beam 64 may be provided between 5,200 nm to 5,800 nm.

With continuing reference to FIG. 2, one or more focusing lenses 68 can be provided in the laser processing apparatus 60 between the laser 62 and the ferrule assembly 12. The focusing lens(es) 68 focuses the laser beam 64 into a smaller, focused laser beam 64' head-on onto the end portion 18 of the optical fiber 16 to concentrate the energy distribution of the laser beam 64 and laser shape the optical surface 22 into the end face 24 of the optical fiber 16. The focusing width may be one hundred twenty-five micrometers (125 µm), as a non-limiting example.

By emitting the laser beam 64 head-on to the end portion 18 of the optical fiber 16, the optical surface 22 of a desired geometric shape can be formed in the end face 24 of the optical fiber 16. The laser 62 is under control of a controller 70 to control the emission of the laser beam 64 from the laser 62. By "head-on laser shaping," it is meant that the laser beam 64 is directed by the laser 62 in the laser beam path 66 collinear or substantially collinear to the fiber axis $A_1$ of the optical fiber 16. Substantially collinear means that the laser beam 64 is directed by the laser 62 in the laser beam path 66 at an acute angle $\phi_2$ up to and including thirty (30) degrees to the fiber axis $A_2$ of the optical fiber 16. The end face 24 of the end portion 18 of optical fiber 16 is exposed to the laser beam 64 to laser shape a polished optical surface 22 in the end face 24 of the optical fiber 16. In this manner, as will be described in more detail below, the entire surface area of the end face 24 of the optical fiber 16 can be exposed to the laser beam 64 at the same time during laser shaping, making it unnecessary, unless desired, to rotate the optical fiber 16, the ferrule assembly 12, or the laser 62 during laser processing. If desired, the optical fiber 16 may be rotated to homogenize the energy distribution of the laser beam 64 and/or to create different geometries of the optical surface 22 in the end face 24 of the optical fiber 16. The head-on laser shaping of the optical surface 22 in the optical fiber 16 can also be conveniently employed after the end portion 18 has been bonded in the ferrule assembly 12 to change the geometry, radius of curvature, apex, and/or fiber roughness of the optical surface 22, as desired.

With continuing reference to FIG. 2, to facilitate head-on laser shaping of the optical fiber 16, a fixture 72 is configured to support either the end portion 18 of the optical fiber 16 or the ferrule assembly 12 such that the laser beam path 66 is collinear or substantially collinear to the fiber axis $A_1$ of the optical fiber 16. In one embodiment, the head-on laser shaping of the optical fiber 16 can be performed before disposing the optical fiber 16 in the ferrule 14. In another embodiment, the head-on laser shaping of the optical fiber 16 can be performed while the end portion 18 of the optical fiber 16 is disposed in the ferrule 14 of the ferrule assembly 12. In this latter case, the fixture 72 supports the ferrule assembly 12. The fixture 72 positions the end face 22 of the optical fiber 16 in the laser beam path 66 collinear or substantially collinear to fiber axis $A_1$ of the optical fiber 16.

As will also be described in more detail below, the head-on laser shaping of the optical surface 22 in the end portion 18 of the optical fiber 16 can also be performed in one laser processing step, if desired. As also discussed in more detail below, the cross section energy distribution of the laser beam 64 can also be controlled to laser shape the optical surface 22 in the end face 24 of the optical fiber 16 of the desired geometry as part of the one step laser processing. Also, as discussed in more detail below, the controller 70 may be configured to control the laser 62 to control the duration of the exposure of the end portion 18 of the optical fiber 16 to the laser beam 64 to control the distance between the final prepared end face 22 of the optical fiber 16 and the end face 20 of a ferrule 14. For example, the final distance between the final prepared end face 22 of the optical fiber 16 and the end face 20 of a ferrule 14 may be between 0.1 µm and 5 µm, as a non-limiting example.

The laser 62 can laser shape the optical surface 22 in the end face 24 of the optical fiber 16 by ablating (i.e., vaporizing and/or thermally flowing) of the end portion 18 of the optical fiber 16. Ablation involves raising the temperature of the end portion 18 of the optical fiber 16 to transform the material from a solid form to either a liquid form or a gaseous form. Thermally flowing involves raising the temperature of the end portion 18 of the optical fiber 16 from a solid form into a liquid form. Vaporization involves raising the temperature of the end portion 18 of the optical fiber 16 beyond the temperature required to thermally flow the end portion 18 to transform the end portion 18 into a gaseous form. Whether the optical fiber 16 is thermally flowed or vaporized is a function of the energy absorbed from the laser beam 64 by the optical fiber 16. The intensity of the laser beam 64 as well as the duration of exposure are factors that control energy absorption. For example, the laser 62 may be controlled by the controller 70 to emit the laser beam 64 to raise the temperature of the end portion 18 of the optical fiber 16 to approximately 2500 degrees Celsius to 3000 degrees Celsius to vaporize the end portion 18 of the optical fiber 16, as a non-limiting example. The vaporization point of a fused silica optical fiber is approximately 2700 degrees Celsius. Lower temperatures, such as 1600 degrees Celsius to 2700 degrees Celsius will cause thermal flowing of the end portion 18 of a silica optical fiber 16 as opposed to vaporization. Pure silica begins to melt at approximately 1800 degrees Celsius, but may start to soften at 1600 degrees Celsius.

The ferrule 14 is made of a material that is also absorptive to the energy of the laser beam 64. For example, the ferrule 14 may be made of zirconia as a non-limiting example. Thus, it may be desired to prevent or reduce energy absorption of the laser beam 64 by the ferrule 14 so as to not damage the ferrule 14. In this regard, to protect the ferrule 14 from being exposed or substantially exposed to the laser beam 64, the fixture 72 also includes an optional aperture 74 disposed in the laser beam path 66 between the ferrule assembly 12 and the laser 62. The material 76 of the aperture 74 may be made of material that can be absorptive of the energy of the laser beam 64 to prevent the energy of the laser beam 64 from reaching or substantially reaching the ferrule 14. A laser beam opening 78 is disposed in the aperture 74 that is aligned by the fixture 72 with the end portion 18 of the optical fiber 16 in the ferrule assembly 12 to allow the energy of the laser beam 64 to pass through and to reach and laser shape the optical surface 22 in the end portion 18 of the optical fiber 16. Thus, the aperture 74 allows the cross section energy distribution of the laser beam 64 to reach the end portion 18 of the optical fiber 16 and not the ferrule 14. The laser beam opening 78 may be an orifice or other hollow section, or may include a window that is configured to allow the energy of the laser beam 64 to pass therethrough and reach the end portion 18 of the optical fiber 16. In this embodiment, the laser beam opening 78 has an inner diameter $ID_1$ the same or substantially the same as the outer diameter $OD_1$ (e.g., 125 µm) of the end portion 18 of the optical fiber 16.

With continuing reference to FIG. 2, the laser processing apparatus 60 may also include one or more laser beam shaping optics 80. For example, the laser beam shaping optic(s) 80 may be a diffractive optic. The laser beam shaping optic(s) 80 receives the laser beam 64 and controls the cross section energy distribution of the laser beam 64 to laser shape the optical surface 22 on the end face 24 of the optical fiber 16 according to the desired geometry. FIGS. 5A-8C described in more detail below illustrate examples of cross section energy distributions of the laser beam 64 that can be provided to laser shape the optical surface 22 on the end face 24 of the optical fiber 16 according to the desired geometry and taking into consideration the material type and energy absorption characteristics of the optical fiber 16 and its components, including a core and cladding.

It may also be desired to control the temperature of the end portion 18 of the optical fiber 16 during laser shaping to ablate the desired optical surface 22 in the end face 24 of the optical fiber 16. The exposure time of the end portion 18 of the optical fiber 16 to the laser beam 64' may be controlled to control the temperature by controlling the duration of the emission of the laser beam 64 from the laser 62. In this regard, the controller 70 may be configured to control the laser 62 to emit the laser beam 64 for a predetermined period of time to control the duration of exposure of the end portion 18 of the optical fiber 16 to the laser beam 64' during laser shaping. The duration of exposure may be configured to only allow the temperature of the end portion 18 of the optical fiber 16 to thermally flow, or rise to higher temperatures to vaporize. The duration of exposure of the laser beam 64' to the end portion 18 of the optical fiber 16 may also influence or control the final geometric shape of the optical surface 22 formed in the end face 24 of the optical fiber 16.

Figure 3:
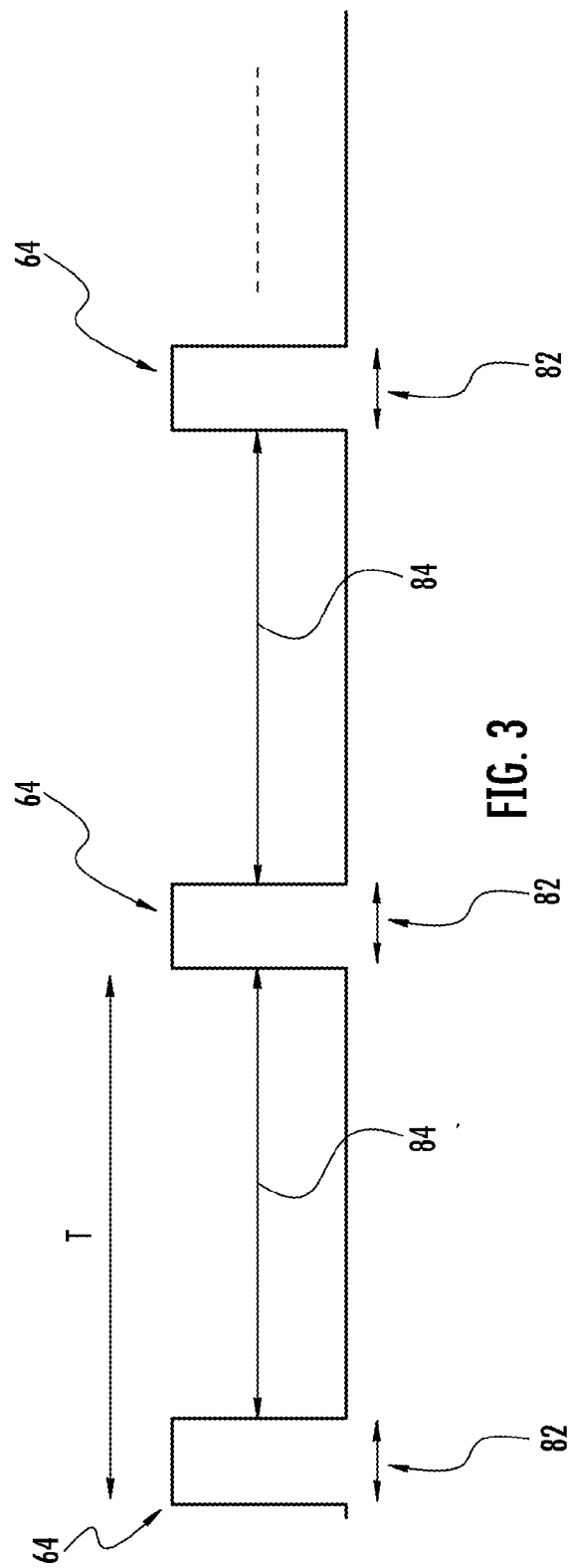
FIG. 3 is a schematic diagram of controlling the laser pulse width duration of the laser in the laser processing apparatus in FIG. 2 during emission of the laser beam head-on on the end portion of the optical fiber in the ferrule assembly.

Another method of controlling the temperature of the end portion 18 of the optical fiber 16 is to control the laser 62 to emit pulses of the laser beam 64 over a designated period of time. In this regard, FIG. 3 illustrates the laser beam 64 emitted by the laser 62 in FIG. 2 under pulse width duration control. As illustrated in FIG. 3, the laser 62 (shown in FIG. 2) is controlled to control the pulse width duration 82 of the laser beam 64 over a given period T during the laser shaping of the end portion 18 of the optical fiber 16. The laser beam 64 is emitted for the pulse width duration 82 during each period T in a periodic fashion to control the temperature of the end portion 18 of the optical fiber 16. A portion of the end portion 18 of the optical fiber 16 may be removed with each pulse of the laser beam 64 depending on the pulse width duration 82 (e.g., between 100 nm and 10 μm in terms of distance). The pulse width durations 82 may be controlled to be between approximately 0.1 nanoseconds (ns) and 300 μs, as a non-limiting example. The temperature of the end portion 18 of the optical fiber 16 rises during the pulse width duration 82. The laser 62 is controlled to provide rest time 84 between emissions of the laser beam 64 pulses for the pulse width duration 82. The temperature of the end portion 18 of the optical fiber 16 does not increase during the rest time 84. For example, as a non-limiting example, the rest times 84 may be approximately 25 μs to 100 ms in each period for pulse width durations 82 between 50 μs and 100 μs as a non-limiting example.

The laser beam 64 can also be pulsed to control the temperature of the end portion 18 of the optical fiber 16 during laser shaping of the optical surface 22 by employing an optional acousto-optical modulator (AOM) 86, as illustrated in FIG. 2. An AOM 86 may be capable of generating pulse width durations 82 of laser beam 64 pulses that are significantly shorter than can be accomplished by controlling the emission of the laser beam 64 by the controller 70. The AOM 86 is disposed between the laser 62 and the ferrule assembly 12. The AOM 86 can diffract and shift the frequency of the laser beam 64 using sound waves. The properties of the laser beam 64 exiting the AOM 86 can be controlled in terms of deflection, intensity, frequency, phase, and polarization. For example, the AOM 86 may generate laser beam 64 pulses having a pulse width duration 82 between approximately one hundred nanoseconds (100 ns) and ten microseconds (10 μs), as a non-limiting example.

Now that the exemplary laser processing apparatus 60 in FIG. 2 has been described, an exemplary process 90 of head-on laser shaping of the optical surface 22 in the end face 24 of the end portion 18 of the optical fiber 16 will now be described with regard to FIG. 4. The process starts by providing the ferrule assembly 12 (block 92 in FIG. 4). As previously discussed, the ferrule assembly 12 is comprised of the optical fiber 16 disposed along the fiber axis $A_1$ in the ferrule bore 28 of the ferrule 14. The end face 24 of the end portion 18 of the optical fiber 16 is extended from the ferrule bore through the end face 20 of the ferrule 14 at a desired distance $D_1$ before laser shaping begins (see FIG. 1). The end portion 18 of the optical fiber 16 may be laser cut or mechanically cleaved before being disposed in the ferrule bore 28 of the ferrule 14. Alternatively, the optical fiber 16 may be first disposed in the ferrule bore 28 of the ferrule 14, and bonded to the ferrule 14. The optical fiber 16 exposed from the end face 20 of the ferrule 14 may then laser cut to create the end portion 18 of the optical fiber 16 at the desired distance $D_1$ from the end face 20 of the ferrule 14. In either case, the laser 62 is also provided and configured to emit the laser beam 64 in the laser beam path 66 (block 94 in FIG. 4). The aperture 74 can be provided between the ferrule assembly 12 and the laser 62, as previously described, with the laser beam opening 78 aligned in the fiber axis $A_1$ with the end portion 18 of the optical fiber 16. This aperture 74 configuration prevents or reduces the ferrule 14 absorbing energy from the laser beam 64' (block 96 in FIG. 4).

Figure 4:
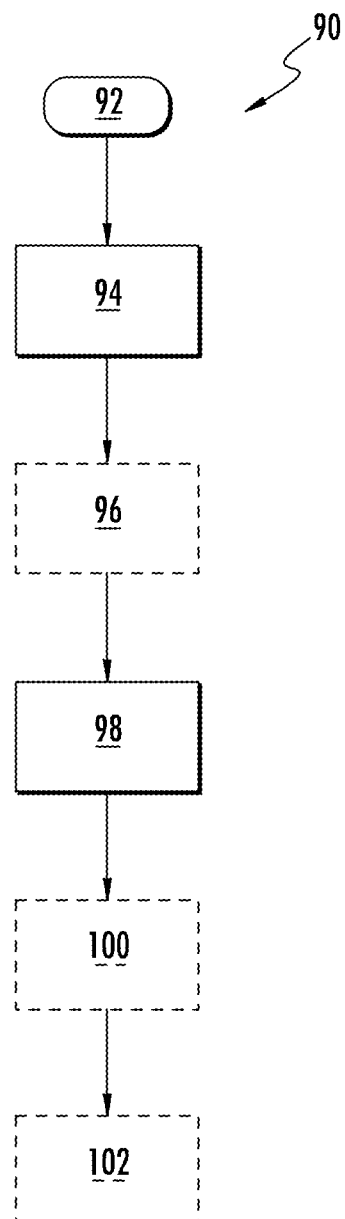
FIG. 4 is a flowchart diagram of an exemplary process of forming an optical surface in an end face of the optical fiber in the ferrule assembly by emitting a laser beam head-on to the end portion of the optical fiber in the laser processing apparatus of FIG. 2.

With continuing reference to FIG. 4, the optical surface 22 is head-on laser shaped in the end face 24 of the end portion 18 of the optical fiber 16 by controlling the laser 62 to emit the laser beam 64 in a laser beam path 66 collinear or substantially collinear to the fiber axis $A_1$ of the optical fiber 16 (block 98 in FIG. 4). This exposes the end face 24 of the optical fiber 16 to the laser beam 64' to laser shape the optical surface 22 in the end face 24 of the optical fiber 16. The laser shaping can be performed in one laser processing step, if desired, that is geometrically compliant with desired design parameters or standards. The controller 70 is designed to control the laser 62 based on programming of the predetermined distance $D_1$ of the end portion 18 of the optical fiber 16 initially disposed beyond the end face 20 of the ferrule 14 before laser shaping. Thus, the head-on laser shaping will result in a final optical surface 22 having the desired distance from the end face of the ferrule 14. A technician may measure the distance $D_1$ of the end portion 18 of the optical fiber 16 initially disposed beyond the end face 20 of the ferrule 14 before laser shaping to ensure the distance $D_1$ is compatible with the programming of the controller 70. As a non-limiting example, an interferometer device may employed to measure distance $D_1$ of the end face 24 of the optical fiber 16 beyond the end face 20 of the ferrule 14.

As previously discussed above, the energy of the laser beam 64' reaching the end face 24 of the end portion 18 of the optical fiber 16 to laser shape the optical surface 22 in the end face 24 can be controlled in a variety of manners. The controller 70 can control the laser 62 to emit the laser beam 64 for a predetermined fixed period of time. The controller 70 can control the laser 62 to emit the laser beam 64 in pulses having pulse width durations 84 (see FIG. 3). The AOM 86 can be provided to diffract the laser beam 64. In any scenario, the controller 70 can be configured to either vaporize or thermally flow the end portion 18 of the optical fiber 16 as previously discussed. If the end portion 18 of the optical fiber 16 is thermally flowed, the flowing portion of the end portion 18 can be removed while flowing to form the optical surface 22 in the end face 24 of the optical fiber 16, such as directing air flow across the end portion 18 of the optical fiber 16 (block 100 in FIG. 4). After head-on laser shaping is performed, the distance $D_1$ of the optical surface 22 from the end face 20 of the ferrule 14 may optionally be measured for quality control (block 102 in FIG. 4). As a non-limiting example, an interferometer device may employed to measure distance $D_1$ of the end face 24 of the optical fiber 16 beyond the end face 20 of the ferrule 14.

An advantage of the head-on laser shaping apparatuses and processes described herein are that different geometries of optical surfaces 22 can be formed in the end face 24 of the optical fiber 16, and in one-step processing if desired, based on controlling the cross section energy distribution of the laser beam 64. The laser energy controls the ablation rate of the end portion 18 of the optical fiber 16 based on the material type of the optical fiber 16. In this regard, FIGS. 5A-8C provide examples of different cross section energies that can be provided by the laser 62 in the laser beam 64 to control the final geometric shape of the optical surface 22 laser shaped into the end face 24 of the optical fiber 16.

For example, it may be desired to head-on laser shape a rounded optical surface 22 in the end portion 18 of the optical fiber 16. In this regard, FIG. 5A is a side view of an exemplary ferrule assembly 12(1) comprising an exemplary rounded optical surface 22(1) formed in the end portion 18 of the optical fiber 16. FIG. 5B is a close-up side view of the ferrule assembly 12(1) in FIG. 5A illustrating a close-up view of the rounded optical surface 22(1). The rounded optical surface 22(1) can be formed by the laser processing apparatus 60 in FIG. 2 emitting the laser beam 64 head-on to the end portion 18 of the optical fiber 16.

FIG. 5C is a side view of cross section energy distribution 104(1) of the laser beam 64(1) emitted by the laser 62 in the laser processing apparatus 60 in FIG. 2 to form the rounded optical surface 22(1) in the optical fiber 16 in FIGS. 5A and 5B. To form the rounded optical surface 22(1), the ablation rate about the center fiber axis $A_1$ of the end face 24(1) is controlled to be greater than the ablation rate at the outer portions of the end face 24(1) about axes $A_2$ and $A_3$. Thus, the energy distribution of the laser beam 64(1) is provided as a concave energy distribution 104(1) in this example as illustrated in FIG. 5C to provide less ablation rate about the center fiber axis $A_1$ of the end face 24(1) than the outer portions of the end face 24(1). In this regard, the energy of the laser beam 64(1) is provided with less intensity about the fiber axis $A_1$ and increases in intensity as a function of distance from the fiber axis $A_1$ to provide a higher ablation rate of the end portion 18 of the optical fiber 16 towards axes $A_2$ and $A_3$.

FIG. 6A is a side view of another exemplary ferrule assembly 12(2) comprising an exemplary planar optical surface 22(2) formed in the end portion 18 of the optical fiber 16. FIG. 6B is a close-up side view of the ferrule assembly 12(2) in FIG. 6A illustrating a close-up view of the planar optical surface 22(2). The planar optical surface 22(2) can be formed by the laser processing apparatus 60 in FIG. 2 emitting the laser beam 64 head-on to the end portion 18 of the optical fiber 16.

FIG. 6C is a side view of cross section energy distribution 104(2) of the laser beam 64(2) emitted by the laser 62 in the laser processing apparatus 60 in FIG. 2 to form the planar optical surface 22(2) in the optical fiber 16 in FIGS. 6A and 6B. To form the planar optical surface 22(2), the ablation rate of the end face 24(2) is controlled to be equal across the surface area of the end face 24(2). Thus, the energy distribution of the laser beam 64(2) is provided as a "top hat" energy distribution 104(2) in this example as illustrated in FIG. 6C to provide a constant ablation rate about the center fiber axis $A_1$ across the end face 24(2).

Figure 7A:
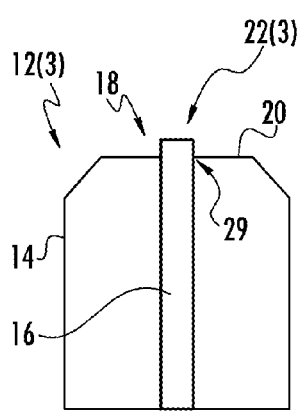
FIG. 7A is a side view of another exemplary ferrule assembly comprising a concave optical surface formed in an end face of a single mode optical fiber extending from a ferrule by the laser processing apparatus in FIG. 2 emitting a laser beam head-on to the end portion of the optical fiber.
Figure 7C:
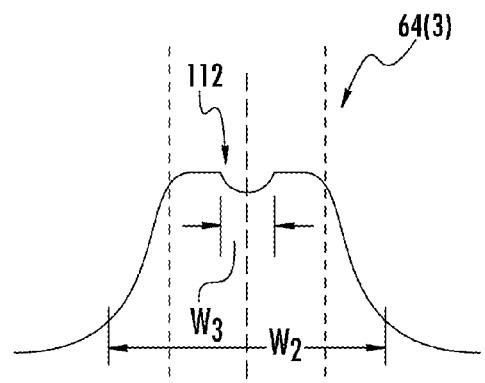
FIG. 7C is a cross section of the energy distribution of the laser beam emitted by the laser in the laser processing apparatus in FIG. 2 to form the concave optical surface in the single mode optical fiber of the ferrule assembly in FIGS. 7A and 7B.
Figure 7B:
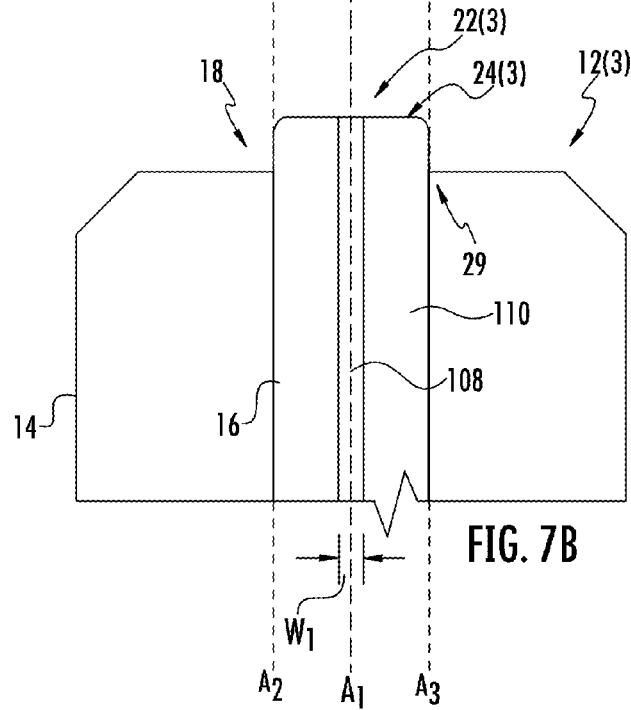
FIG. 7B is a close-up side view of the ferrule assembly in FIG. 7A.

FIG. 7A is a side view of another exemplary ferrule assembly 12(3) comprising an exemplary planar optical surface 22(3) formed in the end portion 18 of the optical fiber 16. FIG. 7B is a close-up side view of the ferrule assembly 12(3) in FIG. 7A illustrating a close-up view of the planar optical surface 22(3). For example, the optical fiber 16 in this embodiment is a single mode fiber that has a core portion 108 of width $W_1$ that has a higher ablation rate than a cladding portion 110. Thus, as illustrated in FIG. 7C, to prevent core dip in the final laser shaped optical surface 22(3), it may be desired to provide a top hat cross section energy distribution 104(3) of the laser beam 64(3) emitted by the laser 62. The top hat cross section energy distribution 104(3) can be formed from a Gaussian cross section energy distribution as a non-limiting example that has a width $W_2$ wider than the width $W_1$ of the end face 24 of the end portion 18 of the optical fiber 16 so that the portion of the laser beam 64(3) energy exposed to the end face 24 is planar or substantially planar. In this example, the top hat cross section energy distribution 104(3) also has a concave center profile with a concave center portion 112 of width $W_3$. In this manner, the intensity of energy of the laser beam 64(4) applied to the core portion 108 is less than the intensity of the energy of the laser beam 64(3) applied to the cladding portion 110. Thus, the core portion 108 and cladding portion 110 will ablate together to form the planar end face 24(3) of the single mode optical fiber 16.

Providing a concave center energy distribution of the laser beam 64 can also be used to head-on laser shape a planar end face in a multi-mode optical fiber as well. In this regard, FIG. 8A is a side view of another exemplary ferrule assembly 12(4) comprising an exemplary planar optical surface 22(4) formed in the end portion 18 of a multi-mode optical fiber 16. FIG. 8B is a close-up side view of the ferrule assembly 12(4) in FIG. 8A illustrating a close-up view of the planar optical surface 22(4). For example, the optical fiber 16 in this embodiment is a multi-mode fiber that has a core portion 116 of width $W_4$ that has a higher ablation rate than a cladding portion 118. Thus, as illustrated in FIG. 8C, to prevent core dip in the final optical surface 22(4), it may be desired to provide a top hat cross section energy distribution 104(4) of the laser beam 64(4) emitted by the laser 62. The top hat cross section energy distribution 104(4) can be formed from a Gaussian cross section energy distribution as a non-limiting example that has a width $W_5$ wider than the width $W_4$ of the end face 24 of the end portion 18 of the optical fiber 16 so that the portion of the laser beam 64(4) energy exposed to the end face 24 is planar or substantially planar. In this example, the top hat cross section energy distribution 104(4) has a concave center profile with a concave center portion 120 of width $W_6$ so that the intensity of energy of the laser beam 64(4) applied to the core portion 116 is less than the intensity of the energy of the laser beam 64' applied to the cladding portion 118. Thus, the core portion 116 and cladding portion 118 will ablate together to form the planar end face 24(4) of the multi-mode optical fiber 16.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

I claim:

1. A method of head-on laser shaping an optical surface on an optical fiber, comprising:
    providing a ferrule assembly comprised an optical fiber disposed along a longitudinal fiber axis in a ferrule bore of a ferrule, the optical fiber having an end face disposed in an end portion of the optical fiber, the end face of the end portion of the optical fiber extending from the ferrule bore through an end face of the ferrule at a predetermined distance beyond the end face of the ferrule;
    providing a laser configured to emit a laser beam in a laser beam path;
    controlling the laser to emit the laser beam in a laser beam path collinear or substantially collinear to the longitudinal fiber axis of the optical fiber, to expose the end face of the optical fiber to the laser beam to laser shape an optical surface in the end face of the optical fiber; and
    measuring the distance from the end face of the ferrule to the end face of the optical fiber, wherein the laser is controlled for a period of time based on a measured distance to laser shape the optical surface in the end face of the optical fiber to a desired distance from the end face of the ferrule.

2. The method of claim 1, comprising controlling the laser to emit the laser beam to thermally flow the end portion of the optical fiber to form the optical surface in the end face of the optical fiber.

3. The method of claim 2, further comprising removing the thermally flowing end portion of the optical fiber beyond a the predetermined distance from an end face of a ferrule in which the end portion of the optical fiber is disposed, to form the optical surface in the end face of the optical fiber at a predetermined distance from the end face of the ferrule.

4. The method of claim 2, comprising controlling the laser to emit the laser beam to raise a temperature of the end portion of the optical fiber between 1600 degrees Celsius and 2700 degrees Celsius to thermally flow the end portion of the optical fiber to form the optical surface in the end face of the optical fiber.

5. The method of claim 1, wherein controlling the laser further comprises controlling the laser to emit the laser beam in laser beam pulses.

6. The method of claim 5, wherein emitting pulses of the laser beam comprises emitting pulse widths having a pulse width duration between approximately 0.1 nanoseconds (0.1 ns) and three hundred microseconds (300 μs) of the laser beam.

7. The method of claim 1, further comprising directing the laser beam emitted by the laser through an acousto-optical modulator disposed between the laser and the end face of the optical fiber to generate laser beam pulses from the laser beam.

8. The method of claim 7, wherein the acousto-optical modulator controls generating the laser beam pulses having a pulse width duration between approximately ten nanoseconds (10 ns) and one hundred microseconds (100 μs).

9. The method of claim 1, comprising controlling the laser to emit the laser beam to vaporize the end portion of the optical fiber to form the optical surface in the end face of the optical fiber.

10. The method of claim 9, comprising controlling the laser to emit the laser beam to raise a temperature of the end portion of the optical fiber between approximately 2500 degrees Celsius and 3000 degrees Celsius to vaporize the end portion of the optical fiber to form the optical surface in the end face of the optical fiber.

11. The method of claim 1, further comprising laser cutting the end portion of the optical fiber to form a cut end face in the optical fiber.

12. The method of claim 11, comprising laser cutting the end portion of the optical fiber to form the cut end face in the optical fiber after extending the end portion of the optical fiber through the end face of the ferrule and prior to controlling the laser to emit the laser beam in a laser beam path.

13. The method of claim 1, further comprising not exposing the ferrule in the laser beam path of the laser, wherein not exposing the ferrule in the laser beam path of the laser comprises:
    placing an aperture having a laser beam opening in the laser beam path between the laser and the end face of the ferrule, wherein the laser beam opening has an inner diameter the same or substantially the same as an outer diameter of the end portion of the optical fiber; and
    aligning the laser beam opening in the aperture with the end face of the optical fiber.

14. A method of head-on laser shaping an optical surface on an optical fiber, comprising:
    providing an optical fiber disposed along a longitudinal fiber axis, the optical fiber having an end face disposed in an end portion of the optical fiber;
    providing a laser configured to emit a laser beam in a laser beam path; and
    controlling the laser to emit the laser beam in a laser beam path collinear or substantially collinear to the longitudinal fiber axis of the optical fiber, to expose the end face of the optical fiber to the laser beam to laser shape an optical surface in the end face of the optical fiber; and
    shaping the laser beam emitted by the laser to have a concave cross section energy distribution to form a rounded optical surface in the end face of the optical fiber having a core with a higher ablation rate than a cladding portion of the optical fiber.

15. The method of claim 14, wherein providing the optical fiber comprises providing a ferrule assembly comprised of the optical fiber disposed along the longitudinal fiber axis in a ferrule bore of a ferrule, the end face of the end portion of the optical fiber extending from the ferrule bore through an end face of the ferrule, the end face of the end portion of the optical fiber extending from the ferrule bore through an end face of the ferrule at a predetermined distance beyond the end face of the ferrule, the method further comprising:

measuring the distance from the end face of the ferrule to the end face of the optical fiber, wherein the laser is controlled for a period of time based on a measured distance to laser shape the optical surface in the end face of the optical fiber to a desired distance from the end face of the ferrule.

16. A method of head-on laser shaping an optical surface on an optical fiber, comprising:

providing an optical fiber disposed along a longitudinal fiber axis, the optical fiber having an end face disposed in an end portion of the optical fiber;

providing a laser configured to emit a laser beam in a laser beam path; and controlling the laser to emit the laser beam in a laser beam path collinear or substantially collinear to the longitudinal fiber axis of the optical fiber, to expose the end face of the optical fiber to the laser beam to laser shape an optical surface in the end face of the optical fiber; and shaping the laser beam emitted by the laser to have a top hat cross section energy distribution to form a planar or substantially planar optical surface in the end face of the optical fiber.

17. The method of claim 16, wherein providing the optical fiber comprises providing a ferrule assembly comprised of the optical fiber disposed along the longitudinal fiber axis in a ferrule bore of a ferrule, the end face of the end portion of the optical fiber extending from the ferrule bore through an end face of the ferrule, the end face of the end portion of the optical fiber extending from the ferrule bore through an end face of the ferrule at a predetermined distance beyond the end face of the ferrule, the method further comprising:

measuring the distance from the end face of the ferrule to the end face of the optical fiber, wherein the laser is controlled for a period of time based on a measured distance to laser shape the optical surface in the end face of the optical fiber to a desired distance from the end face of the ferrule.

18. A method of head-on laser shaping an optical surface on an optical fiber, comprising:

providing an optical fiber disposed along a longitudinal fiber axis, the optical fiber having an end face disposed in an end portion of the optical fiber, wherein the optical fiber is comprised of single mode optical fiber having a core portion with a higher ablation rate than a cladding portion of the optical fiber;

providing a laser configured to emit a laser beam in a laser beam path;

controlling the laser to emit the laser beam in a laser beam path collinear or substantially collinear to the longitudinal fiber axis of the optical fiber, to expose the end face of the optical fiber to the laser beam to laser shape an optical surface in the end face of the optical fiber; and shaping the laser beam emitted by the laser to have a cross section energy distribution having a concave center energy distribution to form a planar or substantially planar optical surface in the end face of the optical fiber.

19. The method of claim 18, wherein providing the optical fiber comprises providing a ferrule assembly comprised of the optical fiber disposed along the longitudinal fiber axis in a ferrule bore of a ferrule, the end face of the end portion of the optical fiber extending from the ferrule bore through an end face of the ferrule, the end face of the end portion of the optical fiber extending from the ferrule bore through an end face of the ferrule at a predetermined distance beyond the end face of the ferrule, the method further comprising:

measuring the distance from the end face of the ferrule to the end face of the optical fiber, wherein the laser is controlled for a period of time based on a measured distance to laser shape the optical surface in the end face of the optical fiber to a desired distance from the end face of the ferrule.

20. A method of head-on laser shaping an optical surface on an optical fiber, comprising:

providing an optical fiber disposed along a longitudinal fiber axis, the optical fiber having an end face disposed in an end portion of the optical fiber, wherein the optical fiber is comprised of multi-mode optical fiber having a core portion with a higher ablation rate than a cladding portion of the optical fiber;

providing a laser configured to emit a laser beam in a laser beam path;

controlling the laser to emit the laser beam in a laser beam path collinear or substantially collinear to the longitudinal fiber axis of the optical fiber, to expose the end face of the optical fiber to the laser beam to laser shape an optical surface in the end face of the optical fiber; and shaping the laser beam emitted by the laser to have a cross section energy distribution having a concave center energy distribution to form a planar or substantially planar optical surface in the end face of the multi-mode optical fiber.

21. The method of claim 20, wherein providing the optical fiber comprises providing a ferrule assembly comprised of the optical fiber disposed along the longitudinal fiber axis in a ferrule bore of a ferrule, the end face of the end portion of the optical fiber extending from the ferrule bore through an end face of the ferrule, the end face of the end portion of the optical fiber extending from the ferrule bore through an end face of the ferrule at a predetermined distance beyond the end face of the ferrule, the method further comprising:

measuring the distance from the end face of the ferrule to the end face of the optical fiber, wherein the laser is controlled for a period of time based on a measured distance to laser shape the optical surface in the end face of the optical fiber to a desired distance from the end face of the ferrule.

\* \* \* \* \*